United States Patent
Wang et al.

(10) Patent No.: US 10,266,625 B2
(45) Date of Patent: Apr. 23, 2019

(54) OLEFIN POLYMERIZATION APPARATUS AND OLEFIN POLYMERIZATION PROCESS

(71) Applicants: CHINA PETROLEUM & CHEMICAL CORPORATION, Beijing (CN); ZHEJIANG UNIVERSITY, Hangzhou, Zhejiang (CN)

(72) Inventors: Jingdai Wang, Zhejiang (CN); Wenqing Wu, Tianjin (CN); Yongrong Yang, Zhejiang (CN); Guodong Han, Tianjin (CN); Zhengliang Huang, Zhejiang (CN); Jingyuan Sun, Zhejiang (CN); Xiaofei Wang, Tianjin (CN); Xiaoqiang Fan, Zhejiang (CN); Huanjun Du, Tianjin (CN); Binbo Jiang, Zhejiang (CN); Zuwei Liao, Zhejiang (CN); Yao Yang, Zhejiang (CN)

(73) Assignees: China Petroleum & Chemical Corporation, Beijing (CN); Zhejiang University, Hangzhou (CN)

( * ) Notice: Subject to any disclaimer, the term of this patent is extended or adjusted under 35 U.S.C. 154(b) by 14 days.

(21) Appl. No.: 15/534,322

(22) PCT Filed: Dec. 9, 2015

(86) PCT No.: PCT/CN2015/096863
§ 371 (c)(1),
(2) Date: Jun. 8, 2017

(87) PCT Pub. No.: WO2016/091175
PCT Pub. Date: Jun. 16, 2016

(65) Prior Publication Data
US 2018/0258204 A1    Sep. 13, 2018

(30) Foreign Application Priority Data

Dec. 9, 2014 (CN) .......................... 2014 1 0748891
Dec. 9, 2014 (CN) .......................... 2014 1 0748898

(51) Int. Cl.
*C08F 210/16* (2006.01)
*B01J 8/18* (2006.01)
(Continued)

(52) U.S. Cl.
CPC ............... *C08F 210/16* (2013.01); *B01J 8/18* (2013.01); *B01J 8/1827* (2013.01); *B01J 8/44* (2013.01);
(Continued)

(58) Field of Classification Search
CPC ..................................... B01J 8/18; C08F 2/34
(Continued)

(56) References Cited

FOREIGN PATENT DOCUMENTS

| CN | 1124029 | 6/1996 |
|---|---|---|
| EP | 3 135 695 A1 * | 3/2017 |
| WO | WO 99/58583 | 11/1999 |

OTHER PUBLICATIONS

International Search Report from the State Intellectual Property Office of the P.R. China for International Application No. PCT/CN2015/096863 dated Feb. 26, 2016.

* cited by examiner

*Primary Examiner* — William K Cheung
(74) *Attorney, Agent, or Firm* — Finnegan, Henderson, Farabow, Garrett & Dunner LLP

(57) ABSTRACT

Provided in the present invention are an olefin polymerization apparatus and an olefin polymerization process. The following operations and effects can be realized by the apparatus or method provided in the present invention: the
(Continued)

gas material discharged from the polymerization reactor is condensed, after the gas-liquid separation, the resulting gas portion is recycled to the reactor to form a circulation loop; the condensate can be selectively introduced to the polymerization reactor, in order to achieve the free switch between the homopolymerization reaction and the copolymerization reaction or between different copolymerization reactions, and at the same time the condensate can absorb the heat generated by the reaction. By using the apparatus and method provided in the present invention, polyolefin products having excellent mechanical properties and processability can be prepared as needed.

23 Claims, 2 Drawing Sheets

(51) Int. Cl.
*C08F 2/34* (2006.01)
*B01J 8/44* (2006.01)
(52) U.S. Cl.
CPC ....... *C08F 2/34* (2013.01); *B01J 2219/00452* (2013.01); *B01J 2219/00477* (2013.01); *C08F 2800/20* (2013.01)
(58) Field of Classification Search
USPC .................................................. 526/348, 64
See application file for complete search history.

OLEFIN POLYMERIZATION APPARATUS AND OLEFIN POLYMERIZATION PROCESS

CROSS-REFERENCE TO RELATED APPLICATIONS

This application is a national stage application under 35 U.S.C. § 371 of International Application No. PCT/CN2015/096863, filed on Dec. 9, 2015, which claims the priority of Chinese Patent Application No. CN 201410748898.0, filed Dec. 9, 2014, and entitled "Polyethylene" and Chinese Patent Application No. CN 201410748891.9, filed Dec. 9, 2014, and entitled "Olefin polymerization apparatus and process," the entire contents of which are incorporated herein by reference.

FIELD OF THE INVENTION

The present invention relates to the technical field of olefin polymerization, and in particular relates to an olefin polymerization apparatus and an olefin polymerization process for producing polyolefins.

BACKGROUND

The gas-phase fluidized bed reactors can be used to produce a variety of polyolefins. The olefin polymers produced by fluidized bed reactor are usually in the form of powder, and fluidization is supplied by a circulation gas consisting of one or more monomers, an inert gas and the like. The conventional gas-phase fluidized bed polymerization apparatus consists of a fluidized bed reactor, a circulation gas compressor, and a circulation gas cooler to form a closed circulation loop, and a circulation gas consisting of reaction monomer ethylene, α-olefin, hydrogen gas and inert gas nitrogen is operated in the circulation loop and brings out the heat released from the polymerization reaction. The catalyst used in the gas-phase fluidized bed polymerization reaction process includes a Ziegler-Natta catalyst, a chromium oxide catalyst and a metallocene catalyst. Because the traditional gas-phase fluidized bed polymerization reaction process has the characteristics of less equipment, short process flow, flexible operation, less discharge, no solvent and low noise, it is an economical and environment-friendly petrochemical industry technology, and gradually becomes the mainstream of the polyethylene process.

For polyolefins, especially polyethylene, the molecular weight and the molecular weight distribution greatly affect the mechanical properties and processabilities of the polymers. In the study of the art, it has been recognized that the higher the molecular weight, the higher the mechanical properties. However, the high-molecular-weight polyolefins have poor fluidity, are difficult to process, and are difficult to blow and extrude at a high shear rate. It is known in the art that expanding the molecular weight distribution of polyethylene can achieve the purpose of improving the rheological properties while maintaining the mechanical properties of the final product; wherein the high-molecular-weight portion ensures the mechanical properties of the product, and the low-molecular-weight portion contributes to improving the processabilities of the product.

A single conventional gas-phase reactor can only produce polyethylene products with single distribution. It is known in the art that simple melt blending of two ethylene polymers with high and low molecular weight distributions can result in heterogeneity of the product. In addition, it has been recognized in the art that it is possible to produce polyethylene having broad/bimodal distribution by subjecting the catalyst or the polymer having the active site to two or more different reaction conditions or gas compositions for reacting continuously.

In the past, bimodal polyethylene is produced in such a way that two or more reactors under different reaction conditions are used in series. European Patent EP-A-691353 describes a process for producing broad/bimodal polyethylene by two conventional gas-phase reactors connected in series; in which the problems that the reactants are routed with each other in the two gas-phase reactors, the residence time of polymer particles in the two gas-phase reactors is not equal and the like are caused. Patent EP-B-517868, U.S. Pat. No. 6,642,323 and U.S. Pat. No. 7,115,687B disclose a process in which a first loop reactor and a second gas-phase fluidized bed reactor are connected in series; in which the problems that the residence time of polymer particles in the two gas-phase reactors is not equal, and the resin produced in the first reactor contains more fine powder are caused.

European Patent EP-B-1012195 and Chinese Patent Application No. 2004800305663 propose a multi-area circulation reactor and process for producing polyolefins having a bimodal molecular weight distribution. The reactor is characterized by comprising an ascending section in a rapid fluidization state and a descending section in a moving bed state which are connected with each other. The two patents have the problems that the reaction gas is routed, and the descending section in the moving bed state cannot be applied to polyethylene production with large heat release. Chinese Patent Application CN 102060943 A discloses a process for preparation of bimodal polyethylene and a gas-phase reactor comprising at least four fluidized beds. In the process, the polymer particles are bubble-fluidized in the first reactor or the third reactor, and the fine powder in the polymer particles is entrained and blown by the elation to the second reactor or the fourth reactor in a rapid fluidization state, the polymer fine powder enters a cyclone separator from the outlet of the second reactor or the fourth reactor for gas-solid separation, and the circulation gas is returned to the reactor in the same reaction condition via the circulation loop; and the solid polymer particles enter another bubbling bed in different reaction conditions. The process has the problems that the operation is complicated and the circulation amount of the polymer particles between reactors having different reaction conditions is limited by the entrained amount of the fine powder.

SUMMARY OF THE PRESENT INVENTION

It is an object of the present invention to provide a novel olefin polymerization apparatus and process. In the olefin polymerization apparatus and process, the gas discharged from the polymerization reactor is subjected to condensation and gas-liquid separation, the gas portion is recycled to the reactor to form a circulation loop, the condensate portion can be intermittently introduced into the polymerization reactor, and the condensate contains a condensing agent and/or a comonomer. On one hand, by selectively introducing the condensate into the reactor, the switch between the homopolymerization reaction and the copolymerization reaction or between the different copolymerization reactions can be achieved. On the other hand, the condensate separated by the gas-liquid separation unit additionally arranged in the apparatus is rich in an inert condensing agent and/or a comonomer, which can well consume the high heat generated by the reaction when introduced into the reactor.

According to an aspect of the present invention, there is provided an olefin polymerization apparatus, comprising:

a polymerization reactor for olefin homopolymerization and/or copolymerization reaction;

a condensation unit for condensing a gas material discharged from the polymerization reactor;

a gas-liquid separation unit for carrying out gas-liquid separation on the material from the condensation unit to generate a gas and a condensate;

storage tanks for receiving the condensate discharged from the gas-liquid separation unit; and a control unit, wherein, the gas from the gas-liquid separation unit is introduced into the polymerization reactor, and the condensate from the storage tanks is selectively introduced into the polymerization reactor under the action of the control unit to achieve the switch between the olefin homopolymerization and copolymerization in the polymerization reactor.

In some preferred embodiments of the present invention, the numbers of the storage tanks are 2 or more, preferably 2 to 4, which are respectively used for storing the condensate containing different comonomers.

In some preferred embodiments of the present invention, the condensate in each of the storage tanks is selectively introduced into the polymerization reactor under the action of the control unit, to achieve the switch between different copolymerization reactions in the polymerization reactor.

According to the olefin polymerization apparatus provided in the present invention, it is possible to achieve the switch between homopolymerization and copolymerization reactions of an olefin by providing only one polymerization reactor to produce an olefin polymer having specific properties, thereby saving the equipment cost and equipment occupation area. More importantly, according to the apparatus provided in the present invention, the switch between different copolymerization reactions of olefins can also be achieved by controlling different comonomers in different storage tanks to be introduced or not into the polymerization reactor, as needed. At the same time, the liquid comonomers introduced into the reactor from the storage tanks are capable of absorbing the high heat generated by the reaction and requiring in-time consumption or discharge when undergoing evaporating vaporization in the reactor.

According to the apparatus provided in the present invention, the polymerization reactor is preferably a fluidized bed reactor.

According to some preferred embodiments of the present invention, the polymerization reactor comprises two or more, preferably 3 to 6 condensate inlets for receiving condensate; and any two of the inlets are located in the same water level or in different water levels. The arrangement of the condensate inlets may be shown, for example, in FIG. 2 of the present invention (FIG. 2 is a schematic view of the positions of the condensate inlets above the distribution plate of the polymerization reactor).

In some embodiments of the present invention, the gas-liquid separation unit is a buffer tank type separator or a cyclone type separator.

In some embodiments of the present invention, the condensation unit is used to cool and partially condense the gas material; and for example, the condensation unit is capable of condensing the gas material in such a way that the condensate content in the material condensed by the condensation unit is in the range of 5-50 wt %, preferably 10-30 wt %. The condensation unit is preferably a heat exchanger, such as a shell-and-tube heat exchanger, a loop heat exchanger.

In some embodiments of the present invention, the apparatus further comprises a compression unit, and the gas material discharged from the polymerization reactor is firstly compressed by the compression unit then enters into the condensation unit. The compression unit properly compresses the gas material, to keep the gas material flows in the pipeline at a certain rate.

In some embodiments of the present invention, pumps are connected between the storage tanks and the polymerization reactor.

In some preferred embodiments of the present invention, the apparatus can be controlled such that the switch frequency between the olefin homopolymerization and copolymerization in the polymerization reactor is at least 1 time/hour, preferably greater than or equal to 3 times/hour.

In some preferred embodiments of the present invention, the apparatus can be controlled such that the switch frequency between the different copolymerization reactions of olefins in the polymerization reactor is at least 1 time/hour, preferably greater than or equal to 3 times/hour.

In some preferred embodiments of the present invention, the olefin is selected from ethylene and/or α-olefins, and the α-olefins are preferably α-olefins with less than 18 carbon atoms.

In some preferred embodiments of the present invention, the comonomer is selected from butene, hexene, octene or other olefins with less than 18 carbon atoms, preferably α-olefins.

In some preferred embodiments of the present invention, the polymerization reactor is further provided with a catalyst inlet for intermittently or continuously introducing the catalyst.

In some preferred embodiments of the present invention, the polymerization reactor is further provided with a discharge port for intermittently or continuously discharging the reaction product polyolefin.

In some preferred embodiments of the present invention, the reaction pressure of the polymerization reactor is 0.5-10 MPa, preferably 1.5-5 MPa; and the reaction temperature is 40-150° C., preferably 50-120° C.

In some preferred embodiments of the present invention, in the apparatus according to the present invention, the feeding port of the gas reaction feedstock is arranged between the condensation unit and the gas material discharge post of the polymerization reactor in the circulation loop, more preferably between the compression unit and the gas material discharge port of the polymerization reactor. The feeding port of the liquid reaction feedstock is preferably arranged between the compression unit and the condensation unit. This arrangement of the feeding ports of the reaction feedstock is advantageous in improving the yield of the apparatus.

According to another aspect of the present invention, there is provided an olefin polymerization process, includes the following steps:

1) reacting an olefin-containing reaction feedstock in a polymerization reactor and discharging a gas material from the polymerization reactor;

2) condensing the gas material, and then separating a gas and at least a portion of condensate (if produced) through a gas-liquid separation unit; and 3) circulating the gas separated by the gas-liquid separation unit into the polymerization reactor, thereby forming a circulation loop, and introducing the condensate info storage tanks;

wherein, the condensate in the storage tanks comprises a comonomer, and the condensate is controlled to be selectively introduced into the polymerization reactor to achieve the switch between olefin homopolymerization and copolymerization in the polymerization reactor.

In some preferred embodiments of the present invention, the above-described process provided in the present invention is implemented on the olefin polymerization apparatus as described above according to the present invention.

In fact, the olefin polymerization process and the olefin polymerization apparatus provided in the present invention have a consistent inventive idea. By adopting the apparatus or process provided in the present invention, the gas discharged from the polymerization reactor is subjected to condensation and gas-liquid separation, wherein the gas portion is recycled to the reactor to form a circulation loop, the condensate can be intermittently introduced to the polymerization reactor, in order to achieve the switch between the homopolymerization reaction and the copolymerization reaction or between different copolymerization reactions, and at the same time the heat release of the reactor is achieved.

In particular, according to the process provided in the present invention, the polymerization reaction in the reactor is freely switched between homopolymerization and copolymerization. When the copolymerization reaction stage is switched to the homopolymerization reaction stage, the gas reaction feedstock (which may contain a small amount of liquid) containing the olefin monomer is introduced from the position below the distribution plate of the polymerization reactor and contacted with the added catalyst to produce a solid-phase polyolefin. The reacted gas stream is discharged from the reactor, and compressed, condensed, and gas-liquid separated in the circulation loop, the gas portion is returned to the reactor, and the liquid portion is stored in the comonomer storage tanks as the condensate to be stand-by without being returned to the reactor. The comonomer contained in the condensate is, for example, one of butene, hexene, octene and like higher olefins, and may be used as a copolymerization feedstock. Depending on different kinds of the comonomers contained, different condensates are stored in different storage tanks. In the homopolymerization reaction stage, the circulation gas stream is substantially free of comonomer after multiple circulations, and now only the homopolymerization reaction occurs in the reactor. At the same time, after multiple circulations in the homopolymerization reaction stage, the stream from the condensation unit is substantially free of condensate and is substantially a gas which is returned directly to the reactor.

If it is desired to switch the homopolymerization reaction stage into the copolymerization reaction stage, the condensate containing the condensing agent and the comonomer is introduced from the storage tanks into the condensate inlets of the reactor (above the polymerization distribution plate of the reactor), and the condensate is gradually vaporized in the reactor, so that a gas-solid area and a gas-liquid-solid three-phase area are formed in the reactor. In the gas-liquid solid three-phase area, the gas reactant and the liquid reactant are contacted with the added catalyst to form a solid-phase polyolefin, and the gas reactant is contacted with the added catalyst in the gas-solid area to form a solid-phase polyolefin. The reacted gas stream is discharged from the reactor, and compressed, condensed, and gas-liquid separated in the circulation loop, and the gas portion is returned to the reactor. The separated liquid enters the comonomer storage tanks and is returned to the reactor; and the unseparated portion of the liquid is returned to the reactor from the position below the distribution plate together with the gas portion. The polymer product is taken out from the reactor intermittently or continuously through the discharge pipeline.

Thus, the above-mentioned "(if produced) condensate" is understood by the skilled person in the art, that is, the condensate means the condensate that may be generated after the gas material is condensed in the homopolymerization stage and the condensate generated after the gas material is condensed in the copolymerization stage. During the homopolymerization operation stage, the stream from the condensation unit is substantially free of condensate after multiple circulations because the introduction of the condensate from the storage tanks into the reactor is stopped; and except this, (namely except the case that the condensed gas material is free of condensate in the homopolymerization reaction stage), all the condensed gas material contains a certain amount of condensate, and the gas-liquid separation unit separates the gas and at least portion of the condensate.

The olefin polymer having specific properties can be prepared by the switch between homopolymerization and copolymerization reactions and between different copolymerization reactions.

The olefin polymerization process provided in the present invention can be used for olefin homopolymerization, binary copolymerization, ternary copolymerization or quaternary or higher copolymerization.

In some preferred embodiments of the present invention, the olefin is selected from ethylene and/or α-olefins, such as one of ethylene, butene, hexene and octene. Among them, the α-olefin is preferably a $C_4$-$C_{20}$ linear or branched α-olefin, preferably a $C_4$-$C_{13}$ linear α-olefin, such as α-butene, α-hexene or α-octene.

In some preferred embodiments of the present invention, the comonomer is selected from $C_2$-$C_{20}$ linear or branched olefins, preferably olefins with less than 18 carbon atoms, such as ethylene, butene, hexene or octene, preferably butene, hexene or octene. The comonomer is preferably α-olefin, for example, preferably selected from α-butene, α-hexene and α-octene.

In one preferred embodiment of the present invention, the olefin is ethylene and the comonomer is selected from butene, hexene and octene.

It is easy to understand that the comonomer is a comonomer of the olefin; therefore, in the above defined range of the terms "olefin" and "comonomer" in the present invention, "olefin" and "comonomer" are not the same olefin monomer simultaneously.

In some preferred embodiments of the present invention, the number of the storage tanks is 2 or more, preferably 2-4, and the storage tanks are respectively used for storing condensate containing different comonomers; and the condensate in each of the storage tanks is controlled to be selectively introduced into the polymerization reactor to achieve the switch between homopolymerization and copolymerization of olefins or between different copolymerization reactions of olefins in the polymerization reactor.

In some preferred embodiments of the present invention, the switch frequency between the olefin homopolymerization and copolymerization is at least 1 time/hour, preferably greater than or equal to 3 times/hour, for example, preferably 3-6 times/hour.

In some preferred embodiments of the present invention, the switch frequency between different copolymerization reactions of olefins is at least 1 time/hour, preferably greater than or equal to 3 times/hour, for example, preferably 3-6 times/hour.

In the process of the present invention, the free switch between the copolymerization reaction and the homopolymerization reaction or between different copolymerization reactions can be achieved. The switch frequency in the preferred embodiment described above is adopted, on one hand, feasibility is considered, and sufficient time can be ensured to consume the comonomer of the previous step at the time of switching, and on the other hand, it is possible to ensure that polyolefins produced in different modes (homopolymerization←→copolymerization, copolymerization←→copolymerization) can be mixed sufficiently.

For example, in one preferred embodiment of the present invention, the olefin is ethylene, the average residence time of polyethylene in the fluidized bed is about 1-3 hours, and the switch frequency is at least 1 time/hour, preferably 3 times/hour or more.

In some preferred embodiments of the present invention, the operation time of each homopolymerization stage is maintained for 3-60 minutes, preferably 8-20 minutes; and the operation time of each copolymerization stage is maintained for 5-60 minutes, preferably 8-20 minutes. Within the foregoing range, both the industrial achievability can be ensured, and the molecular chains of the resulting polyolefins can have a good monomer distribution state, thus a polymer product with stable properties can be obtained.

In some preferred embodiments of the present invention, the operation time of the homopolymerization reaction is at least 18 minutes when the comonomer is butene. In this embodiment, the homopolymeric monomer is preferably ethylene.

In some preferred embodiments of the present invention, the operation time of the homopolymerization reaction is at least 6 minutes when the comonomer is hexene. In this embodiment, the homopolymeric monomer is preferably ethylene.

In some preferred embodiments of the present invention, the operation time of the homopolymerization reaction is at least 3 minutes when the comonomer is octene or other olefins with higher molecular weight. In this embodiment, the homopolymeric monomer is preferably ethylene.

According to the present invention, the "homopolymerization stage" or "homopolymerization reaction stage" can be understood as the stage in which the condensate in the storage tanks is not introduced into the reactor. The "copolymerization stage" or "copolymerization reaction stage" can be understood as the stage in which the condensate in the storage tanks is introduced into the reactor.

In some preferred embodiments of the present invention, in the copolymerization reaction stage, the condensate content in the stream resulting from the condensation of the gas material is 5-50 wt %, preferably 10-30 wt % based on the weight of the stream. The stream is typically a gas-liquid mixture.

In some preferred embodiments of the present invention, 30-100 wt %, preferably 60-100 wt % of the total condensate entering the gas-liquid separation unit is separated by the gas-liquid separation unit. This portion of the condensate is introduced from the condensate inlet above the distribution plate of the reactor. In this case, the unseparated condensate is returned to the reactor together with the gas.

Preferably, the pressure drop of the gas in the circulation stream passing through the gas-liquid separation unit is 1500-6500 Pa.

In the present invention, the catalyst used may be a conventional catalyst such as a Ziegler-Natta catalyst, a chromium-based catalyst, a metallocene catalyst and a post-transition metal catalyst, and the complex thereof.

In some preferred embodiments of the present invention, in the method, before or during polymerization reaction, at least one of a cocatalyst, a polymeric monomer, an antistatic agent, a chain transfer agent, a molecular weight modifier, a condensing agent and an inert gas are introduced into the reactor and/or the circulation loop.

The cocatalyst is a cocatalyst commonly used in the polymerization of olefins, such as alkyl aluminum, aluminum alkoxide and the like, preferably at least one of the following: modified aluminoxane, monochlorodiethyl aluminum, monochlorodiisobutyl aluminum, sesquioethyl aluminum, diisobutyl aluminum, dichloromonoethyl aluminum, trimethyl aluminum, triethyl aluminum, triisobutyl aluminum, trioctyl aluminum, monohydrodiethyl aluminum and monohydrodiisobutyl aluminum, preferably triethyl aluminum and triisobutyl aluminum.

The polymeric monomer may be suitably selected depending on the target product and may be the same as or different from the olefin or comonomer, for example, may be selected from one or more of olefin monomers such as ethylene, butene, hexene and octene.

The antistatic agent is a conventional antistatic agent, for example, selected from one or more of aluminum distearate, ethoxylated amines, polysulfone copolymers, polymeric polyamines, oil-soluble sulfonic acids and the like. In the embodiments disclosed of the present invention, when the antistatic agent is used, a suitable antistatic agent should be carefully selected to avoid introduction of the poisonous materials into the reactor, while using a minimal amount of the antistatic agent to control the electrostatic charges in the reactor within the desired range.

The chain transfer agent is a conventional chain transfer agent including hydrogen and an alkyl metal, preferably hydrogen.

The inert gas is a conventionally used inert gas, such as nitrogen.

The molecular weight modifier is a conventionally used molecular weight modifier.

In some preferred embodiments of the present invention, the condensing agent is selected from at least one of $C_4$-$C_7$ saturated linear or branched alkanes, and $C_4$-$C_7$ cycloalkanes; preferably at least one of n-pentane, iso-pentane, hexane and heptane; most preferably iso-pentane and/or hexane.

In the present invention, the condensate may be either a comonomer (e.g., hexene, heptene, octene or the like), or a saturated alkane (condensing agent) which does not participate in the reaction, and generally a $C_4$-$C_7$ alkane. As an inert condensate, the molecular weight of cyclopentane is similar to that of isopentane, but the latent heat of vaporization is higher than that of isopentane by 25%, and thus the space-time yield can be increased by 25% in the case of the same amount of inert condensate. Isopentane is preferred in the present invention.

In the present invention, the circulation gas is compressed and cooled in the condensation process to produce a portion of liquid stream, and a portion of the liquid stream is returned to the reactor through the storage tanks and the pump, and a portion of the liquid stream can be returned to the reactor with the gas stream. As the vaporization of the liquid stream can absorb a lot of heat, the heat transfer capacity of the fluidized bed reaction is improved, thereby improving the space-time yield of the reactor.

In one preferred embodiment of the present invention, the reaction pressure of the reaction in the step 1) is 0.5-10 MPa, preferably 1.5-5 MPa, more preferably 2.0-3.5 MPa; the reaction temperature is 40-150° C., preferably 50-120° C., more preferably 75-100° C.

According to the process provided in the present invention, the gas reaction feedstock is preferably introduced to the reaction system from the position between the condensation unit and the gas material discharge port of the polymerization reactor in the circulation loop, more preferably from the position between the compression unit and the gas material discharge port of the polymerization reactor. The liquid reaction feedstock is preferably introduced from the position between the compression unit and the condensation unit. The preferred introduction mode of the reaction feedstock can increase the yield of the reaction system.

Compared with the prior art, the present invention have, but are not limited to, the following advantages:

1) by selectively introducing the condensate containing the condensing agent and the comonomer into the reactor, the homopolymerization and copolymerization of the olefins are carried out alternately to obtain the product having excellent mechanical properties and processabilities;

2) the circularly produced condensate in the system not only provides the comonomer to carry out the copolymerization reaction, but also serves to absorb the heat in the reactor, so that the heat generated by the reaction can be brought out in time;

3) the amount of the condensate entering from the position below the distribution plate into the fluidized bed is small to avoid the phenomenon of liquid accumulation at the bottom of the fluidized bed;

4) the kind of the comonomer and the amount of the comonomer condensate introduced into the reactor can be changed according to different product requirements, so that the operation flexibility is increased and a high process application value is achieved;

5) the apparatus and process of the present invention are capable of achieving higher production yields.

BRIEF DESCRIPTION OF THE DRAWINGS

The drawings, which are intended to provide a further understanding of the present invention and form a part of the specification, are intended to be illustrative of the present invention in conjunction with the examples of the present invention and are not to be construed as limiting the present invention.

SPECIFIC EMBODIMENTS

The embodiments of the present invention will be described in detail with reference to the drawings and examples, and how the technical solutions of the present invention can be applied to solve the technical problems and the realization of the technical effects can be fully understood and implemented. It is to be noted that the various examples of the present invention and the various features in the examples may be combined with each other as long as they are not conflicted, and the resulting technical solutions are within the scope of the present invention.

The partial performance parameters of the polyolefin products in the examples are determined by the following method.

(1) Melt flow rate (MFR): the melt flow rate is measured according to the conditions in GB/T 19466.3-2004 (190° C., load of 2.16 kg), and usually noted as MI2.16.

(2) Density: measured according to the method in GB/T 1033.2-2010.

(3) Tensile yield stress: measured in both machine direction (MD) and transverse direction (TD) according to ASTM D882.

(4) Elongation at break: the elongation at break is measured according to the method in GB/T 6344-2008.

(5) Free-falling dart impact value: the free-falling dart impact value is measured according to the A method in GB/T 9639.1-2008.

(6) Density: measured according to the method in GB/T 2410-2008.

Figure 1:
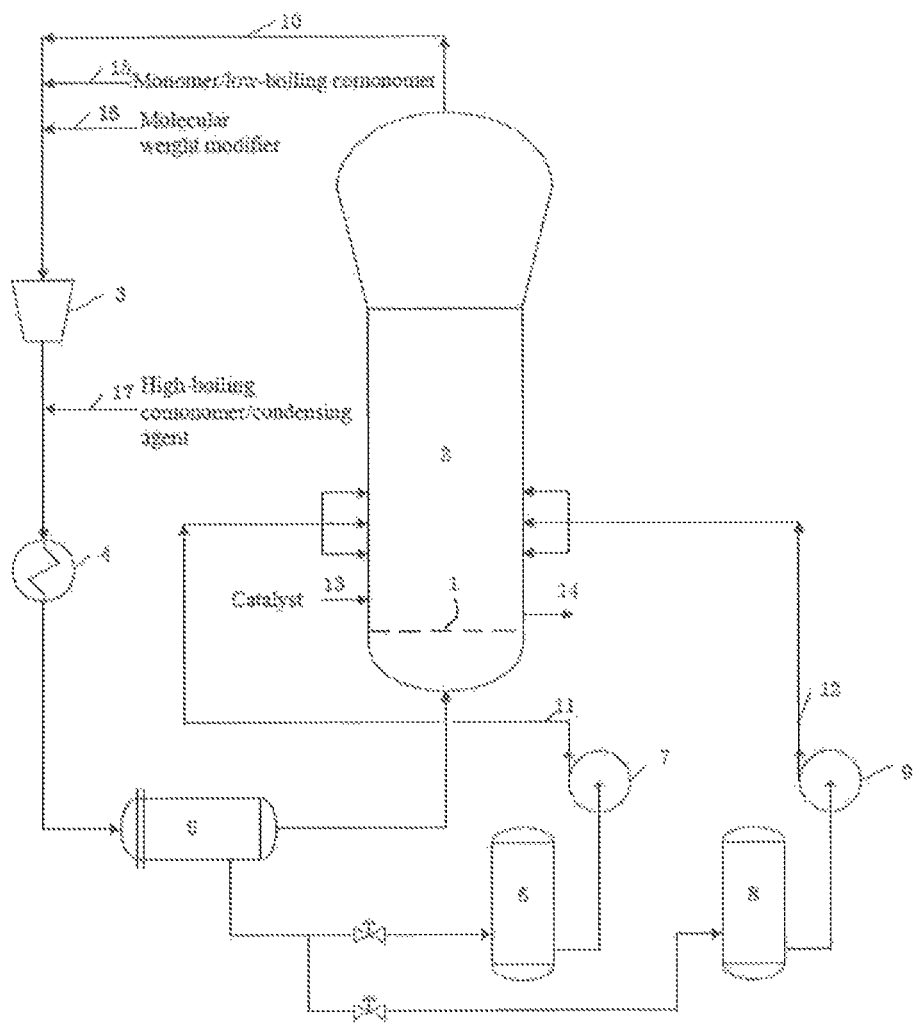
FIG. 1 is an olefin polymerization apparatus and a simplified operational flow chart in one particular embodiment of the present invention.

FIG. 1 shows the olefin polymerization apparatus and the simplified operational flow according to one particular embodiment of the present invention. The shown olefin polymerization apparatus comprises the following components:

a fluidized bed reactor 2 for homopolymerization reaction and copolymerization reaction, in which a distribution plate 1 is arranged;

a gas circulation pipeline 10 for circulating the gas material from the outlet of the reactor 2 to the gas-phase distribution area of the reactor 2;

a compression unit 3 for compressing the material in the circulation pipeline 10;

a heat exchanger 4 for cooling the material in the circulation pipeline 10;

a gas-liquid separation unit 5;

a first storage tank 6 and a second storage tank 8 (exemplary) for storing the condensate;

fluid pipelines 11 and 12 (exemplary) for introducing the condensing agent into the reactor 2;

a first feeding pump 7 and a second feeding pump 9 (exemplary) for introducing the condensate into the reactor 2;

a pipeline 13 for introducing a polymerization catalyst into the reactor 2;

a pipeline 14 for taking out the solid polyolefin from the reactor 2;

fluid pipelines 15 and 16 (exemplary) for introducing the gas material into the reactor 2; and a fluid pipeline 1 (exemplary) for introducing the high-boiling-point comonomer and the condensing agent into the reactor 2.

Wherein, the circulation gas stream after the reaction flows out from the top of the fluidized bed reactor 2, enters the gas circulation pipeline 10, and flows through the compression unit 3 and the heat exchanger 4, and the partially condensed circulation stream flowing from the heat exchanger 4 enters the gas-liquid separation unit 5, the liquid material in the gas-liquid separation unit 5 is partially or completely separated and enters the first storage tank 6 and the second storage tank 8, and the unseparated liquid material enters the gas-phase distribution area of the reactor 2 with the circulation stream to complete one circulation.

In the homopolymerization reaction stage, the condensate in the first storage tank 6 and the second storage tank 8 is no longer introduced into the fluidized bed reactor 2; in the copolymerization reaction stage, the condensate in the first storage tank 6 and the second storage tank 8 is introduced to the position above the distribution plate 1 of the fluidized bed reactor 2 from the fluid pipeline 11 and 12 by the first feeding pump 7 and the second feeding pump 9, respectively. Wherein the first storage tank 6 and the second storage tank 8 may each contain the condensate containing different major comonomers; and certainly may also contain the same condensate. The condensate in one or more storage tanks may be controlled by the control unit (not shown) to be introduced into the reactor 2 as needed.

The fresh reaction feed gas required for the reaction is fed into the gas circulation pipeline 10 through the pipeline 15, the molecular weight modifier or the like can enter the gas circulation pipeline 10 through the pipeline 16, the high-boiling-point comonomer and the condensing agent can enter the gas circulation pipeline 10 through the pipeline 17, the catalyst intermittently or continuously enters the reactor 2 through the pipeline 13, and the solid-phase polymer produced in the polymerization reaction is intermittently or continuously discharged from the pipeline 14 and transported to the downstream stage for further processing.

Figure 2:
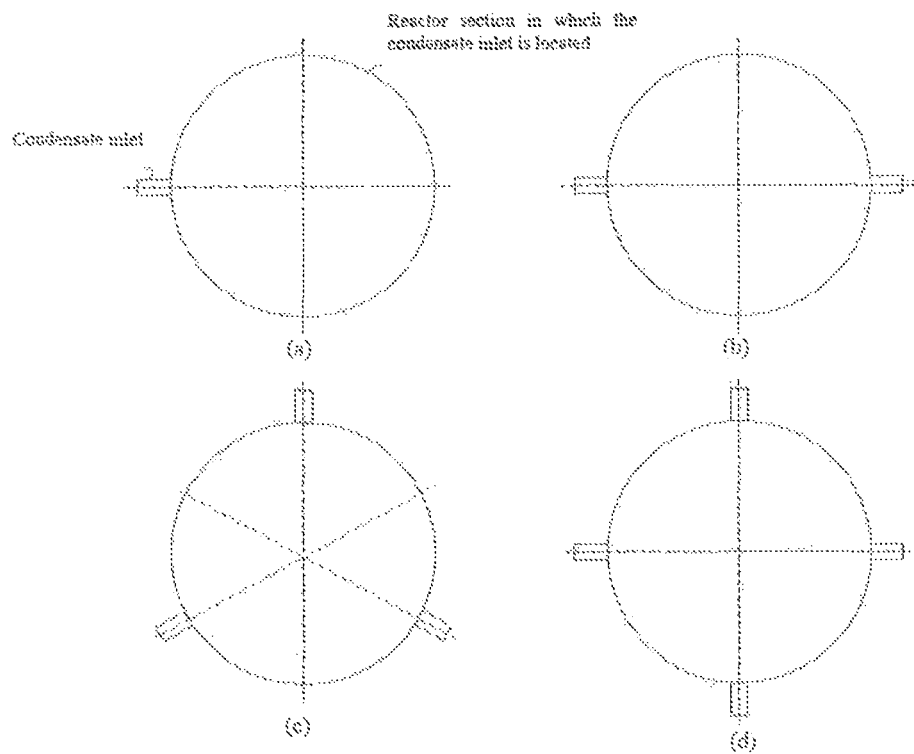
FIG. 2 is a schematic view showing the arrangement of condensate inlets above the polymerization distribution plate in one particular embodiment of the present invention, wherein FIGS. 2(a), (b), (c) and (d) show the conditions in which 1, 2, 3 and 4 condensate inlets are arranged, respectively.

At least one, preferably 3-6 liquid introduction points, i.e., condensate inlets, are distributed in the axial and radial directions of the reactor. FIG. 2 shows the distribution of the liquid introduction points in the radial direction of the reactor. FIGS. 2 (*a*)-(*d*) show the conditions in which 1-4 liquid introduction points are arranged in a plane, respectively. During the copolymerization reaction operation, the condensate in the first storage tank 6 and the second storage tank 8 are continuously fed into the reactor 2 from the liquid introduction points through the first feeding pump 7 and the second feeding pump 9.

Example 1

The linear low density polyethylene (LLDPE) is produced in the fluidized bed polymerization reactor apparatus shown in FIG. 1. Under the action of a Ziegler-Natta (Z-N) catalyst system, the polymerization reaction temperature is 88° C., the pressure is 2.1 MPa, and the superficial velocity of the reactor is 0.61 m/s.

When the compolymerization reaction is switched into homopolymerization reaction, the circulation gas in the pipeline 10 includes hydrogen, nitrogen, methane, ethane, ethylene, butene, inert $C_4$ and isopentane, the pressure is 2.1 MPa and the temperature is 90° C. After multiple circulations of the circulation gas, the circulation gas stream from the heat exchanger 4 contained no condensate, and the gas-phase density is 28.0 kg/m$^3$; and gas-solid two-phase reaction is performed in the fluidized bed reactor, and ethylene is contacted with the continuously added catalyst to produce solid polyolefins.

When the homopolymerization reaction is switched into compolymerization reaction, the circulation gas in the pipeline 10 includes hydrogen, nitrogen, methane, ethane, ethylene, butene, inert $C_4$ and isopentane. The circulation gas stream from the heat exchanger 4 contained 15 wt % of condensate, the condensate contained isopentane and α-butene and the density is 593 kg/m$^3$. When passing through the external gas-liquid separator 5, 80 wt % of the total condensate in the circulation gas stream entered the first storage tank 6, and the condensate not entering the first storage tank 6 entered the reactor 2 with the circulation gas stream. The condensate rich in the comonomer in the first storage tank 6 is introduced into the fluidized bed through the first feeding pump 7 for copolymerization reaction.

The above-mentioned copolymerization and homopolymerization reactions are switched repeatedly at 3 times/hour. The space-time yield of the system is 135 kg/m$^3$·hr; and the production capacity is increased by 50% compared to those of conventional gas-phase process.

The density of the linear low density polyethylene produced according to the example is 0.9210 g/cm$^3$, the melt flow rate is 0.78 g/10 min, the tensile yield stress is up to 11.6 MPa, the elongation at break is 765%, the haze is 11.7%, and the free-falling dart impact damage weight is 114 g.

Example 2

The linear low density polyethylene (LLDPE) is produced in the fluidized bed polymerization reactor apparatus shown in FIG. 1 by using a stepwise polymerization reaction process. Under the action of the Z-N catalyst system, the polymerization reaction temperature is 87° C., the pressure is 2.1 MPa, and the superficial velocity of the reactor is 0.72 m/s.

When the compolymerization reaction is switched into homopolymerization reaction, the circulation gas in the pipeline 10 includes hydrogen, nitrogen, methane, ethane, ethylene, isopentane and hexene, the pressure is 2.1 MPa and the temperature is 87° C. After multiple circulations of the circulation gas, the circulation gas stream from the heat exchanger 4 contained no condensate, and the gas-phase density is 28.8 kg/m$^3$; and gas-solid two-phase reaction is performed in the fluidized bed reactor, and ethylene is contacted with the continuously added catalyst to produce the solid-phase polymer.

When the homopolymerization reaction is switched into the compolymerization reaction, the circulation gas in the pipeline included hydrogen, nitrogen, methane, ethane, ethylene, isopentane and hexene, the circulation gas stream from the heat exchanger 4 contained 30 wt % of condensate, the condensate contained isopentane and α-hexene, the density is 601 kg/m$^3$ and the gas-phase density is 29.1 kg/m$^3$. After separation and enrichment of the gas-liquid separator 5, the condensate flowing into the second storage tank 8 can reach 50 wt % of the total condensate in the circulation gas stream, and is injected into the fluidized bed from three condensate inlets in different heights above the distribution plate through the second feeding pump 9. In this process, the pressure of the second feeding pump 9 is 3.5 MPa and the rate at which the liquid-phase material is injected into the fluidized bed reactor 2 is 60 t/hr. The condensate is atomized and injected into the fluidized bed through nozzles.

The above-mentioned copolymerization and homopolymerization reactions are switched repeatedly at 5 times/hour. The space-time yield of the system is 151 kg/m$^3$·hr; and the production capacity is increased by 68% compared to those of conventional gas-phase process.

The density of the linear low density polyethylene produced according to the example is 0.9175 g/cm$^3$, the melt flow rate is 1.9 g/10 min, the tensile yield stress is up to 9.9 MPa, the elongation at break is 670%, the haze is 17.9%, and the free-failing dart impact damage weight is 142 g.

Example 3

The linear low density polyethylene (LLDPE) is produced in the fluidized bed polymerization reactor apparatus shows in FIG. 1 by using a stepwise polymerization reaction process. Under the action of the Z-N catalyst system, the polymerization reaction temperature is 85° C., the pressure is 2.3 MPa, and the superficial velocity of the reactor is 0.70 m/s.

When the compolymerization reaction is switched into homopolymerization reaction, the circulation gas in the pipeline 10 includes hydrogen, nitrogen, methane, ethane, ethylene, hexene, hexane and the like, the pressure is 2.3 MPa and the temperature is 86° C. After multiple circulations of the circulation gas, the circulation gas stream from the heat exchanger 4 contained no condensate, and the gas-phase density is 29.1 kg/m$^3$; and gas-solid two-phase reaction is performed in the fluidized bed reactor, and ethylene is contacted with the continuously added catalyst to produce the solid-phase polymer.

When the homopolymerization reaction is switched into the compolymerization reaction, the circulation gas stream from the heat exchanger 4 contained 10 wt % of condensate, and the condensate contained hexene and hexane, the density is 618.7 kg/m$^3$ and the gas-phase density is 30.0 kg/m$^3$. After separation and enrichment of the gas-liquid separator 5, the condensate entering the second storage tank 8 can reach 65 wt % of the total condensate in the circulation gas stream, and is injected into the reactor from three liquid introduction points in the same level through the second feeding pump 9. The distribution of the three liquid introduction points is shown in FIG. 2 (c). The flow rate of the introduced liquid material is 26 t/h, the temperature is 52° C., and the pressure is 3.6 MPa. The condensate is atomized and injected into the reactor through nozzles.

The above-mentioned copolymerization and homopolymerization reactions are switched repeatedly at 6 times/hour. The space-time yield of the fluidized bed reactor is 140 kg/m$^3$·hr; and the production capacity is increased by 56% compared to those of conventional gas-phase process.

The density of the linear low density polyethylene produced according to the example is 0.9218 g/cm$^3$, the melt flow rate is 0.95 g/10 min, the tensile yield stress is up to 11.7 MPa, the elongation at break is 635%, the haze is 13.0%, and the free-falling dart impact damage weight is 168 g.

Example 4

The linear low density polyethylene (LLDPE) is produced in the fluidized bed polymerization reactor apparatus shown in FIG. 1 by using a stepwise polymerization reaction process. Under the action of the Z-N catalyst system, the polymerization reaction temperature is 85° C., the pressure is 2.5 MPa, and the superficial velocity of the reactor is 0.67 m/s.

When the compolymerization reaction is switched into the homopolymerization reaction, the circulation gas in the pipeline 10 includes hydrogen, nitrogen, methane, ethane, ethylene, isopentane, hexene and the like, the pressure is 2.5 MPa and the temperature is 86° C. After multiple circulations of the circulation gas, the circulation gas stream from the heat exchanger 4 contained no condensate, and the gas-phase density is 28.9 kg/m$^3$; and gas-solid two-phase reaction is performed in the fluidized bed reactor, and ethylene is contacted with the continuously added catalyst to produce the solid-phase polymer.

When the homopolymerization reaction is switched into the compolymerization reaction, the circulation gas stream from the heat exchanger 4 contained 28 wt % of condensate, the liquid phase is isopentane and hexene, the density is 620.4 kg/m$^3$ and the gas-phase density is 31.2 kg/m$^3$. After separation and enrichment of the gas-liquid separator 5, the condensate entering the second storage tank 8 can reach 70 wt % of the total condensate in the circulation gas stream, and is introduced into the reactor from four liquid introduction points in the same level on the sidewall of the reactor through the second feeding pump 9. The distribution of the four liquid introduction points is shown in FIG. 2 (d). The flow rate of the introduced liquid material is 56 t/h, and the pressure is 3.9 MPa. At the liquid introduction points, the condensate is atomized and injected into the reactor through nozzles.

The above-mentioned copolymerization and homopolymerization reactions are switched repeatedly at 4 times/hour. The space-time yield of the fluidized bed reactor is 165 kg/m$^3$·hr; and the production capacity is increased by 83%.

The density of the linear low density polyethylene produced according to the example 4 is 0.9119 g/cm$^3$, the melt flow rate is 0.87 g/10 min, the tensile yield stress is up to 8.4 MPa, the elongation at break is 864%, the haze decreases to 10.3%, and the free-falling dart impact damage weight is 149 g.

Figure 3:
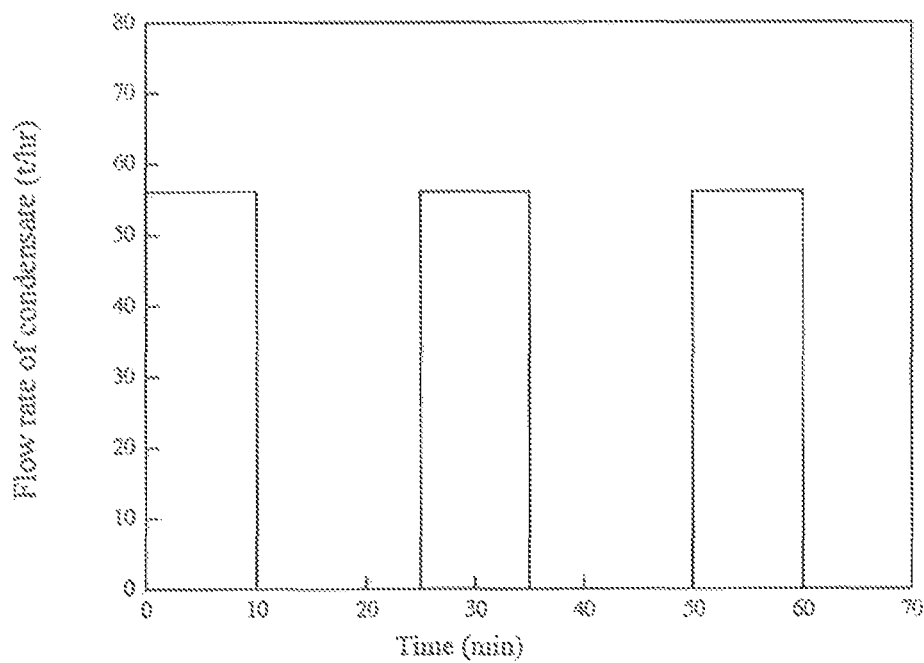
FIG. 3 shows the change in the amount of liquid injected from the condensate inlets over time according to Example 4 disclosed herein.

FIG. 3 is a schematic view showing the change in the amount of liquid injected from the side wall of the reactor over time in the example. It can be seen from FIG. 3 that the copolymerization time is 10 minutes and the homopolymerization time is 15 minutes. It is to be noted that in the example, the separation efficiency of the gas-liquid separator 5 is 70 wt %, i.e., after the gas-liquid mixed stream discharged irons the heat exchanger 4 passes through the gas-liquid separator 5, the condensate accounting for 70 wt % of the condensate in the circulation gas stream enters the second storage tank 8 and enters the reactor 2 from the liquid introduction points on the sidewall through the second feeding pump 9.

In this example, the liquid is introduced from the sidewall of the reactor, so that the liquid accumulation on the distribution plate is avoided, the introduction amount of the condensate in the reactor can be increased and the space-time yield can be improved; and in addition, a plurality of low-temperature/comonomer enrichment areas and high-temperature areas are formed in the reactor, so that the products with wide molecular weight distribution can be produced.

Example 5

The linear low density polyethylene (LLDPE) is produced in the fluidized bed polymerization reactor apparatus shown in FIG. 1 by using a stepwise polymerization reaction process. Under the action of the Z-N catalyst system, the polymerization reaction temperature is 80° C., the pressure is 2.3 MPa, and the superficial velocity of the reactor is 0.67 m/s.

When the compolymerization reaction is switched into the homopolymerization reaction, the circulation gas in the pipeline 10 includes hydrogen, nitrogen, methane, ethane, ethylene, butene, insert C$_4$, a small amount of isopentane, a small amount of hexene and the like, the pressure is 2.3 MPa and the temperature is 80° C. After multiple circulations of the circulation gas, the circulation gas stream from the heat exchanger 4 contained no condensate; and gas-solid two-phase reaction is performed in the fluidized bed reactor, and ethylene is contacted with the continuously added catalyst to produce the solid-phase polymer.

When the homopolymerization reaction is switched into the compolymerization reaction, the circulation gas stream from the heat exchanger 4 contained 9 wt % of condensate, the liquid phase is butene and isopentane, the density is 580 kg/m³ and the gas-phase density is 30.9 kg/m³. After separation and enrichment of the gas-liquid separator 5, the condensate entering the first storage tank 6 can reach 65 wt % of the total condensate in the circulation gas stream, and is injected into the reactor from liquid introduction points shown in FIG. 2(b) through the first feeding pump 7. The flow rate of the liquid material introduced from the sidewall is 22 t/h, and the pressure is 3.7 MPa.

When the homopolymerization reaction is switched into the compolymerization reaction, the circulation gas stream from the heat exchanger 4 contained 22 wt % of condensate, the liquid phase is isopentane and hexene, the density is 616.8 kg/m³ and the gas-phase density is 28.3 kg/m³. After separation and enrichment of the gas-liquid separator 5, the condensate entering the second storage tank 8 can reach 65 wt % of the total condensate in the circulation gas stream, and is introduced into the reactor from four liquid introduction points in the same level through the second feeding pump 9. The distribution of the four liquid introduction points is shown in FIG. 2 (d). The flow rate of the liquid material introduced from the sidewall is 60 t/h, and the pressure is 3.9 MPa. At the liquid introduction points, the condensate is atomized and injected into the reactor through nozzles.

The above-mentioned copolymerization and homopolymerization reactions are switched repeatedly at 7 times/hour. The space-time yield of the fluidized bed reactor is 130 kg/m³·hr; and the production capacity is increased by 44%.

The density of the linear low density polyethylene produced according to the example 5 is 0.9150 g/cm³, the melt flow rate is 0.91 g/10 min, the tensile yield stress is up to 8.6 MPa, the elongation at break is 870%, the haze decreases to 10.7%, and the free-felling dart impact damage mass is 210 g.

Example 6

The medium density polyethylene (MDPE) is produced in the fluidized bed polymerization reactor apparatus shown in FIG. 1 by using a stepwise polymerization reaction process. Under the action of the Z-N catalyst system, the polymerization reaction temperature is 91° C., the pressure is 2.1 MPa, and the superficial velocity of the reactor is 0.65 m/s.

When the compolymerization reaction is switched into the homopolymerization reaction, the circulation gas in the pipeline 10 includes hydrogen, nitrogen, methane, ethane, ethylene, a small amount of isopentane, a small amount of hexene and the like, the pressure is 2.3 MPa and the temperature is 91° C. After multiple circulations of the circulation gas, the circulation gas stream from the heat exchanger 4 contained no condensate; and gas-solid two-phase reaction is performed in the fluidized bed reactor, and ethylene is contacted with the continuously added catalyst to produce the solid-phase polymer. In the example, the duration time of each homopolymerization reaction stage is about 8 minutes.

When the homopolymerization reaction is switched into the ethylene-hexene compolymerization reaction, the circulation gas stream from the heat exchanger 4 contained 26 wt % of condensate, the liquid phase is isopentane and hexene, the density is 604.4 kg/m³ and the gas-phase density is 28.6 kg/m³. After separation and enrichment of the gas-liquid separator 5, the condensate entering the second storage tank 8 can reach 70 wt % of the total condensate in the circulation gas stream, and is introduced into the reactor from four liquid introduction points two of which are located in the same level through the second feeding pump 9. The distribution of the four liquid introduction points is shown in FIG. 2 (d). The flow rate of the liquid material introduced from the side wall is 65 t/h, and the pressure is 3 MPa. At the liquid introduction points, the condensate is atomized and injected into the reactor through nozzles. In the example, the duration time of each homopolymerization reaction stage is about 12 minutes.

The above-mentioned copolymerization and homopolymerization reactions are switched repeatedly at 5 times/hour. The space-time yield of the fluidized bed reactor is 145 kg/m³·hr; and the production capacity is increased by 60%.

The density of the medium density polyethylene produced according to the example 6 is 0.9300 g/cm³, the melt flow rate is 0.34 g/10 min, the tensile yield stress is up to 20.5 MPa, the elongation at break is 592%, the haze is 17%, and the free-falling dart impact damage mass is 75 g.

Example 7

The high density polyethylene (HDPE) is produced in the fluidized bed polymerization reactor apparatus shown in FIG. 1 by using a stepwise polymerization reaction process. Under the action of the Z-N catalyst system, the polymerization reaction temperature is 100° C., the pressure is 2.1 MPa, and the superficial velocity of the reactor is 0.63 m/s. In the production process, the homopolymerization reaction is predominant in the fluidized bed reactor, the circulation gas stream in the pipeline 10 includes hydrogen, nitrogen, methane, ethane, ethylene, isopentane, a small amount of butene and the like, the pressure is 2.1 MPa and the temperature is 100° C. The circulation gas stream at the outlet of the heat exchanger 4 contained no condensate; and gas-solid two-phase reaction is performed in the fluidized bed reactor, and ethylene is contacted with the continuously added catalyst to produce the solid-phase polymer. The density of the high density polyethylene produced according to the example 7 is 0.9485 g/cm³, the melt flow rate is 1.1 g/10 min, the tensile yield stress is 21 MPa, the elongation at break is 500%, the haze is 21%, and the free-falling dart impact damage mass is 65 g.

From the results of the above examples, it can be seen that the olefin polymerization apparatus and the olefin polymerization process provided in the present invention can produce the polyolefin products having excellent mechanical properties and excellent processabilities, and have wide application space and high application value.

The invention claimed is:
1. An olefin polymerization apparatus, comprising:
   a polymerization reactor for olefin homopolymerization and/or copolymerization reaction;
   a condensation unit for condensing a gas material discharged from the polymerization reactor;
   a gas-liquid separation unit for carrying out gas-liquid separation on the material from the condensation unit to generate a gas and a condensate;
   storage tanks for receiving the condensate discharged from the gas-liquid separation unit; and
   a control unit,
   wherein,
   the gas from the gas-liquid separation unit is introduced into the polymerization reactor, and
   the condensate from the storage tanks is selectively introduced into the polymerization reactor under the action of the control unit to achieve the switch between the olefin homopolymerization and copolymerization in the polymerization reactor.

2. The apparatus according to claim 1, characterized in that, the numbers of the storage tanks are 2 or more, and the storage tanks are respectively used for storing the condensate containing different comonomers.

3. The apparatus according to claim 2, characterized in that, the condensate in each of the storage tanks is selectively introduced into the polymerization reactor under the action of the control unit to achieve the switch between different copolymerization reactions in the polymerization reactor.

4. The apparatus according to claim 1, characterized in that, the polymerization reactor is a fluidized bed reactor.

5. The apparatus according to claim 1, characterized in that, the polymerization reactor comprises two or more condensate inlets for receiving condensate; any two of the inlets are located in the same water level or in different water levels.

6. The apparatus according to claim 1, characterized in that, the gas-liquid separation unit is a buffer tank type separator or a cyclone type separator.

7. The apparatus according to claim 1, characterized in that, the apparatus further comprises a compression unit, and the gas material discharged from the polymerization reactor is firstly compressed by the compression unit and then enters into the condensation unit.

8. The apparatus according to claim 1, characterized in that, pumps are connected between the storage tanks and the polymerization reactor.

9. The apparatus according to claim 2, characterized in that, the apparatus can be controlled such that the switch frequency between the olefin homopolymerization and copolymerization in the polymerization reactor is at least 1 time/hour.

10. The apparatus according to claim 2, characterized in that, the apparatus can be controlled such that the switch frequency between the different copolymerization reactions of olefins in the polymerization reactor is at least 1 time/hour.

11. An olefin polymerization process, includes the following steps:
1) reacting an olefin-containing reaction feedstock in a polymerization reactor and discharging a gas material from the polymerization reactor;
2) condensing the gas material, and then separating a gas and at least a portion of condensate through a gas-liquid separation unit; and
3) circulating the gas separated by the gas-liquid separation unit into the polymerization reactor, thereby forming a circulation loop, and introducing the condensate into storage tanks;
wherein,
the condensate in the storage tanks comprises a comonomer, and
the condensate is controlled to be selectively introduced into the polymerization reactor to achieve switch between olefin homopolymerization and copolymerization in the polymerization reactor.

12. The process according to claim 11, characterized in that, the process is implemented on the apparatus according to claim 1.

13. The process according to claim 11, characterized in that, the olefin is selected from ethylene and/or α-olefins; the comonomer is selected from olefins with less than 18 carbon atoms.

14. The process according to claim 11, characterized in that, the numbers of the storage tanks are 2 or more, which are respectively used for storing the condensate containing different comonomers; and
the condensate in each of the storage tanks is controlled to be selectively introduced into the polymerization reactor to achieve switch between homopolymerization and copolymerization of olefins or the different copolymerization reactions of olefins in the polymerization reactor.

15. The process according to claim 11, characterized in that, the switch frequency between the olefin homopolymerization and copolymerization is at least 1 time/hour.

16. The process according to claim 14, characterized in that, the switch frequency between different copolymerization reactions of olefins is at least 1 time/hour.

17. The process according to claim 11, characterized in that, the operation time of each homopolymerization stage is maintained for 3-60 minutes; the operation time of each copolymerization stage is maintained for 5-60 minutes.

18. The process according to claim 17, characterized in that, when the comonomer is butene, the operation time of homopolymerization reaction is at least 18 minutes; when the comonomer is hexene, the operation time of homopolymerization reaction is at least 6 minutes; when the comonomer is octene or other olefins with higher molecular weights, the operation time of homopolymerization reaction is at least 3 minutes.

19. The process according to claim 11, characterized in that, in the copolymerization reaction stage, the condensate content in the stream resulting from the condensation of the gas material is 5-50 wt % based on the weight of the stream.

20. The process according to claim 11, characterized in that, 30-100 wt % of the total condensate entering the gas-liquid separation unit is separated by the gas-liquid separation unit.

21. The process according to claim 11, characterized in that, in the polymerization process of the process, at least one of a cocatalyst, a polymeric monomer, an antistatic agent, a chain transfer agent, a molecular weight modifier, a condensing agent and an inert gas are introduced into the reactor and/or the circulation loop.

22. The process according to claim 21, characterized in that, the condensing agent is selected from at least one of C4-C7 saturated linear or branched alkanes, and C4-C7 cycloalkanes.

23. The process according to claim 11, characterized in that, the reaction pressure of the reaction in the step 1) is 0.5-10 MPa; and the reaction temperature is 40-150° C.

* * * * *